United States Patent

John

[15] 3,666,836

[45] May 30, 1972

[54] BLENDS OF POLYPROPYLENE WITH HYDROGENATED HYDROCARBON RESINS

[72] Inventor: Andrew John, Newark, Del.
[73] Assignee: Hercules Incorporated, Wilmington, Del.
[22] Filed: Sept. 26, 1969
[21] Appl. No.: 861,445

[52] U.S. Cl. ..........................260/897 A, 260/235, 260/23 H, 260/33.6 PQ, 260/45.7 S, 260/45.85, 260/45.95, 260/897 R, 264/210, 264/289
[51] Int. Cl. ......................................C08f 41/12, C08f 29/12
[58] Field of Search..................................................260/897

[56] References Cited

UNITED STATES PATENTS 3,299,174  1/1967  Kuhre et al. ............................260/876

FOREIGN PATENTS OR APPLICATIONS 1,024,718  4/1966  Great Britain........................260/897

*Primary Examiner*—Murray Tillman
*Assistant Examiner*—C. Seccuro
*Attorney*—William L. Peverill

[57] ABSTRACT

Blends of polypropylene with hydrogenated polymers and copolymers of styrene. The useful polymers have a precisely defined molecular weight distribution and must be hydrogenated to the point where at least 50 percent of the aromatic unsaturation is reduced. The blends are useful in preparation of heat sealable films and capacitor dielectrics.

3 Claims, No Drawings

BLENDS OF POLYPROPYLENE WITH HYDROGENATED HYDROCARBON RESINS

This invention relates to blends of polypropylene with hydrogenated, substantially amorphous styrene polymers and to oriented films prepared therewith. In particular, it relates to such compositions wherein the styrene polymers meet specific molecular weight limitations.

It has been proposed to add resinous additives to polypropylene for several different reasons. For example, certain nitrogen containing resins have been suggested for the improvement of dye receptivity. Hydrogenated polyterpenes have been suggested for the improvement of heat sealability. Rubbery, elastomeric resins have been employed to improve the low temperature tensile properties. These additives, while they are quite effective for their intended purposes, are frequently plagued with the problem of lack of compatibility with the polyolefin, resulting in either exudation thereof to the surface of the polymer or in an undesirable effect on appearance as the polymer and resin phases separate.

Hydrogenated resins based on styrene and styrene homologs such as alkyl substituted styrenes have not been used in such applications as those mentioned due to their lack of compatibility with polyolefins.

In accordance with this invention, it has been determined that useful polypropylene compositions containing hydrogenated styrene polymers can be prepared if styrene polymers are employed which have a relatively narrow molecular weight distribution predominantly between about 600 and 20,000. The invention provides compositions comprising 60 to 95 percent by weight of stereoregular polypropylene and 5 to 40 percent by weight of a styrene hydrocarbon polymer, said styrene polymer being selected from the class consisting of homopolymers of styrene and alkyl substituted styrenes, copolymers of styrene and alkyl substituted styrenes, copolymers of alkyl substituted styrenes with each other, and copolymers of styrene and alkyl substituted styrenes with other hydrocarbons having non-aromatic carbon-to-carbon unsaturation, said styrene polymer being characterized by having at least about 50 percent of its aromatic unsaturation hydrogenated, having a number average molecular weight distribution such that no more than about 15 percent of the polymer has a molecular weight outside the range of 600 to 20,000 and having a drop softening point between about 70° and 170° C.

The expression "stereoregular polypropylene" employed in this specification and in the attached claims is intended to include not only propylene homopolymer but copolymers of propylene with minor amounts of ethylene or butene-1. Such materials, which contain up to about 3 or 4 percent of the comonomer, are usually considered to be polypropylene inasmuch as the concentration of comonomer is not sufficient to alter most of the usual polypropylene properties.

The styrene polymers which can be hydrogenated and used in the practice of the invention are known resins. They are prepared by polymerization in the presence of a Lewis acid such as $BF_3$ etherate or aluminum chloride or other processes known in the art which give polymers in the desired molecular weight range. They can be homopolymers of styrene or of methyl substituted styrene such as $\alpha$-methyl styrene or vinyl toluene. They can also be copolymers of such monomers with each other such as, e.g., styrene, vinyl toluene copolymer, $\alpha$-methyl styrene vinyl toluene copolymer, or styrene, $\alpha$-methyl styrene copolymer. They can be copolymers of styrene and substituted styrenes with terpenes such as, e.g., dipentene, carene, pinene, terpinene, limonene, turpentine, alloocimene, and terpinolene. They can also be copolymers of one of the styrenes with an aliphatic $\alpha$-olefin or a diene such as ethylene, propylene, butene-1, butadiene or the like or copolymers with polymerizable unsaturates such as indene.

The hydrogenated styrene polymers are characterized by their molecular weight distribution. Thus, they must have substantially no molecules having a molecular weight greater than about 20,000, and preferably none greater than about 10,000. They must also, preferably, have substantially no molecular species of less than about 600 molecular weight. In total, at least about 85 percent of the resin must be within the molecular weight range of about 600 to 20,000. Within these limitations, the overall number average molecular weight is not critical. It is found that as the amount of material in the total polymer which has molecular weight of 20,000 and above increases, the compatibility of the resin in the polyolefin decreases. At the other end of the scale, the presence of material of less than 600 molecular weight causes the blended polymer mass to become tacky.

Regardless of the molecular weight of the resin, however, it will not be compatible with the polypropylene unless it is hydrogenated to the point where at least 50 and preferably at least about 70 percent of the aromatic unsaturation is reduced. The minimum degree of hydrogenation required appears to be a function of the composition of the copolymer, specifically, the aromatic content thereof. Thus a copolymer of one of the styrene derivatives with an aliphatic olefin or diene can be compatible if about 50 percent of the aromatic unsaturation is reduced. A styrene homopolymer or a copolymer of two aromatic-containing olefins wherein the aromatic content is high must have at least about 85 percent of the aromatic unsaturation reduced. Hydrogenation of the resins is accomplished by a standard practices using a nickel catalyst. Techniques for hydrogenation of aromatic rings are well known. The degree of reduction of the aromatic ring is determined by measuring the decrease in intensity of the U.V. absorption band due to aromatic unsaturation at 266 millimicrons.

The third parameter employed in characterizing the styrene polymers used in this invention is the softening point. This parameter indicates the temperature at which the polymer changes from a rigid to a soft state as determined by the Hercules drop method (Harris - "The Hercules Drop Method for Determining the Softening Point of Resins and Modified Rosins" Herc. 400–431C, 1955). The drop softening point (DSP) is preferably between about 70° and 170°. If the softening point is lower, the resin can cause tackiness of the polymer surface; if it is too high, it approaches the softening point of the polymer and exhibits insufficient plasticizing effect during heat sealing and the like operations.

The blended compositions of this invention are particularly useful in the production of oriented films. The presence of the styrene resin imparts heat sealability to the polyolefin which normally is difficult or even impossible to seal. This is a valuable attribute for the employment of such films in packaging and related arts. Another property improvement afforded by the styrene resins is a significant increase in the tensile modulus of a film prepared therewith. This increase can be as great as 100 percent over that of a film of a neat, unblended polyolefin. The increased modulus is advantageous when dealing with thin films inasmuch as it substantially improves the handling of the films on automatic packaging equipment.

Films of the blended compositions of this invention are also very useful in certain electrical applications, in particular, in the preparation of capacitors. In capacitor winding applications, the thinnest films obtainable are desired in order to keep the overall size of the capacitor as small as possible. Such thin films, however, on the order of 25 to 15 gauge, are normally difficult to wind without introducing wrinkles. The increased modulus of films prepared with the blends of this invention aids considerably in overcoming this problem, and greatly facilitates the winding operation. Moreover, it is found that the presence of the styrene resin in the film-forming composition does not detract from the good electrical properties possessed by the polypropylene film prior to blending with the resin. For example, the dielectric constant of neat-polypropylene film is about 2.1 to 2.3, whereas that of a film of an alloy of polypropylene and about 20 percent of a hydrogenated vinyl toluene $\alpha$-methyl styrene copolymer is about 2.25.

A further property of the blended compositions of this invention which makes them useful in capacitor manufacture is that they are easily wetted by a variety of non-polar organic liquids. In the preparation of capacitors, the wound element consisting of dielectric and conductor is inserted into a case and impregnated with a dielectric liquid whose purpose is to fill completely all of the tiny voids or air spaces which are inevitably formed by winding of two solid materials. The efficiency of this impregnation depends in large measure on the wettability of the dielectric member. The usual polyolefin film is difficult to wet and the art has had to resort to special steps to facilitate wetting. No such special steps are required with films of the compositions of this invention.

The blends of the invention will also contain, in most cases, heat and light stabilizers for the polymer, as is customary in the polyolefin art. Any of the heat and light stabilizers normally employed for this purpose can be employed. Such stabilizing ingredients include by way of example, antacids such as calcium stearate, antioxidants and heat stabilizers such as alkylated phenols, alkylidene bis(alkylphenol) terpene phenols, polyhydroxychromans and alkyl esters of thiodialkanoic acids, and light stabilizers such as benzophenone derivatives, and alkyl and aralkyl esters of salicylic acid.

In the examples which follow, the invention is illustrated in several of its embodiments, but it is not intended to be limited thereto. In the examples, the molecular weights of the resins were determined by means of gel permeation chromatography using a porous glass (Porasil 60) column 20 feet long × 5/16 inch in diameter calibrated with styrene homopolymer standards of known molecular weight. Unless otherwise specified, references to parts and percentages are to parts and percentages by weight.

EXAMPLE 1

A copolymer of about 30 percent α-methyl styrene and 70 percent vinyl toluene (Piccotex 120) was hydrogenated sufficiently to reduce about 67 percent of the initial aromatic unsaturation present therein. The hydrogenation was carried out in an autoclave on a 45 percent solution of the copolymer in methyl cyclohexane using pelleted nickel on an alkaline treated support as a catalyst.

A polymer blend comprising 20 parts of the 67 percent hydrogenated copolymer, and 80 parts of polypropylene stabilized with 0.1 percent calcium stearate and 0.1 percent of a phenolic antioxidant was compounded in a Brabender Plasticorder for 5 minutes at 220° C. to a homogeneous mixture. This was compression molded in a laboratory press to form a film. This film was milky in appearance, indicating that the resin and polymer are incompatible.

When the above procedure was repeated with a resin hydrogenated to 99 percent reduction, a clear film resulted, indicating that the polymer and resin were compatible. This specimen was analyzed by means of gel permeation chromatography and determined to have a molecular weight distribution ranging from about 600 to about 20,000, with a very small fraction, less than about 5 percent, greater than 20,000. Drop softening point of the 99 percent hydrogenated material was 156° C.

Formulations comprising the hydrogenated copolymer and stabilized polypropylene containing 0.4 percent clay based on polypropylene weight were prepared by dry-blending. These were extruded at 205° C. onto a chill roll to form 25 mil films which were subsequently biaxially oriented by drawing 6.0x in each direction.

Properties of these films and of a standard polypropylene control film are recorded in the following table.

| Ex. No. | Resin conc. | Tensile strength (p.s.i.) | Modulus (p.s.i.) | Elong. at break, percent | Overlap heat seal strength (g./in.[1]) | | |
|---|---|---|---|---|---|---|---|
| | | | | | 250° | 270° | 290° |
| Control | 0 | 32,000 | 270,000 | 30 | Nil | Nil | Nil |
| 1 (a) | 15 | 30,300 | 497,000 | 87 | 41/84 | T [2] /279 | 338/608 |
| 1 (b) | 20 | 28,400 | 468,000 | 91 | 57/114 | 184/342 | 545/890 |
| 1 (c) | 25 | 28,900 | 475,000 | 84 | 72/143 | 188/367 | T/781 |

[1] Average/peak strength.
[2] T indicates sample tore, due to extremely high seal strength.

EXAMPLE 2

The procedure substantially as described in Example 1 was repeated using hydrogenated α-methyl styrene homopolymer as the additive resin. The resin was hydrogenated to the extent of about 99 percent and was completely compatible with the polymer, as indicated by the pressed film test. Gel permeation chromatography indicates that this resin has a molecular weight range of about 600 to about 7,000. Its DSP is 103°. When this material was formed into a film, the following properties were measured.

| Ex. No. | Resin conc., percent | Tensile strength (p.s.i.) | Modulus (p.s.i.) | Elongation at break, percent | Overlap heat seal strength (g./in.) | | |
|---|---|---|---|---|---|---|---|
| | | | | | 250° | 270° | 290° |
| 2 | 13.5 | 31,500 | 420,000 | 88 | T | T | 150 |

EXAMPLE 3

The styrene resin in this example was a homopolymer of styrene having a molecular weight range from about 500 to about 6,000 and a DSP of 89° C. The resin was hydrogenated to the extent of about 99 percent reduction of the aromatic unsaturation and was compatible with the polymer. The following properties were measured on a polypropylene film containing 20 percent by weight of the styrene resin.

Tensile Strength —28,500 psi
Modulus —465,000 psi
Elongation —92%
Overlap Heat Seal Strength (g./in.) —250° ⎫
270° ⎬ Sample tore in each case.
290° ⎭

EXAMPLES 4 and 5

In these examples the additive resins were copolymers of styrene and terpenes. Example 4 is 35 percent styrene and 65 percent mixed terpenes, while Example 5 is 50 percent styrene and 50 percent mixed terpenes. Both were hydrogenated to saturate at least 95 percent of their aromatic unsaturation and make them compatible with propylene. The DSP of Example 4 was 104° and that of Example 5 was 119°. Properties of films were as follows:

| Ex. No. | Resin conc. | Tensile strength (p.s.i.) | Modulus (p.s.i.) | Elongation at break, percent | Overlap heat seal strength (g./in.*) | | |
|---|---|---|---|---|---|---|---|
| | | | | | 225° | 250° | 275° |
| 4 | 19 | 28,300 | 45,000 | 71 | T/38 | 36/101 | 99/113 |
| 5 | 19 | 31,400 | 40,300 | 82 | 24/95 | T/198 | 117/123 |

*Average/peak strength.

EXAMPLE 6

The resin employed in this example was a 97 percent hydrogenated styrene homopolymer having a substantial fraction of molecular weight in the 50,000 range. Gel permeation chromatography indicated the presence of two distinct molecular weight distributions, one covering the range about 600 to 8,000, the other about 10,000 to about 50,000. This material, by the pressed film test described hereinabove, was found to be incompatible with polypropylene. The DSP was 110°.

What I claim is:
1. A polymer composition comprising about 60 to 95 percent by weight of stereoregular polypropylene and about 40 to percent by weight of a hydrocarbon polymer selected from the class consisting of:
  a. copolymers of styrene with terpene hydrocarbons; and
  b. copolymers of alkyl substituted styrenes with terpene hydrocarbons, said hydrocarbon polymer having at least about 50 percent of its initial aromatic unsaturation hydrogenated, having a number average molecular weight distribution such that no more than about 15 percent of the polymer has a molecular weight outside the range of about 600 to 20,000 and having a drop softening point between about 70° and 170° C.

2. An unsupported film prepared from a composition according to claim 1.

3. A film according to claim 2 which has been oriented along at least one of its axes.

* * * * *